(12) United States Patent
Zhang et al.

(10) Patent No.: US 8,371,019 B1
(45) Date of Patent: Feb. 12, 2013

(54) METHOD FOR MANUFACTURING A MAGNETIC WRITE POLE HAVING STRAIGHT SIDE WALLS AND A WELL DEFINED TRACK-WIDTH

(75) Inventors: Sue Siyang Zhang, Saratoga, CA (US); Yi Zheng, San Ramon, CA (US); Qiping Zhong, San Jose, CA (US); Honglin Zhu, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 39 days.

(21) Appl. No.: 13/187,370

(22) Filed: Jul. 20, 2011

(51) Int. Cl.
*G11B 5/127* (2006.01)
*H04R 31/00* (2006.01)

(52) U.S. Cl. ............... 29/603.16; 29/603.12; 29/603.13; 29/603.14; 29/603.15; 29/603.18; 216/62; 216/65; 216/66; 360/121; 360/122; 360/317; 451/5; 451/41

(58) Field of Classification Search ............... 29/603.11, 29/603.13–603.16, 603.18, 605, 606; 216/62, 216/66, 67; 360/212, 122, 317; 451/5, 41
See application file for complete search history.

(56) References Cited

U.S. PATENT DOCUMENTS

| | | | |
|---|---|---|---|
| 6,710,973 B2 | 3/2004 | Okada et al. | |
| 7,311,850 B2 | 12/2007 | Kamijima et al. | |
| 7,441,325 B2 | 10/2008 | Gao et al. | |
| 7,444,740 B1 | 11/2008 | Chung et al. | |
| 8,146,236 B1 * | 4/2012 | Luo et al. | 29/603.16 |
| 8,268,407 B2 * | 9/2012 | Jiang et al. | 427/551 |
| 2010/0062177 A1 * | 3/2010 | Jiang et al. | 427/551 |
| 2010/0112486 A1 | 5/2010 | Zhang et al. | |
| 2010/0302680 A1 | 12/2010 | Hirata et al. | |

FOREIGN PATENT DOCUMENTS

| | | |
|---|---|---|
| JP | 2007/257711 A | 10/2007 |
| JP | 2008/204566 A | 9/2008 |
| JP | 2008/217846 A | 9/2008 |
| JP | 2009/129496 A | 6/2009 |
| JP | 2010/092565 A | 4/2010 |
| WO | 2009/101689 A1 | 8/2009 |

* cited by examiner

*Primary Examiner* — Paul D Kim
(74) *Attorney, Agent, or Firm* — Zilka-Kotab, PC

(57) ABSTRACT

A method for manufacturing a magnetic write head having a write pole with a very narrow track width, straight well defined sides and a well defined trailing edge width (e.g. track-width). The method includes uses two separate chemical mechanical polishing processes that stop at separate CMP stop layers. The first CMP stop layer is deposited directly over a RIEable fill layer. A RIE mask, is formed over the fill layer and first CMP stop layer, the RIE mask having an opening. A trench then is formed in the RIEable fill layer. A second CMP stop layer is then deposited into the trench and over the RIE mask, followed by plating of a magnetic material. First and second chemical mechanical polishing processes are then performed, the first stopping at the first CMP stop and the second stopping at the second CMP stop.

25 Claims, 24 Drawing Sheets

METHOD FOR MANUFACTURING A MAGNETIC WRITE POLE HAVING STRAIGHT SIDE WALLS AND A WELL DEFINED TRACK-WIDTH

FIELD OF THE INVENTION

The present invention relates to perpendicular magnetic write heads and more particularly to a method for manufacturing a perpendicular magnetic write head having a very narrow write pole.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head can include a magnetic write pole and a magnetic return pole, the write pole having a much smaller cross section at the ABS than the return pole. The magnetic write pole and return pole are magnetically connected with one another at a region removed from the ABS. An electrically conductive write coil induces a magnetic flux through the write coil. This results in a magnetic write field being emitted toward the adjacent magnetic medium, the write field being substantially perpendicular to the surface of the medium (although it can be canted somewhat, such as by a trailing shield located near the write pole). The magnetic write field locally magnetizes the medium and then travels through the medium and returns to the write head at the location of the return pole where it is sufficiently spread out and weak that it does not erase previously recorded bits of data.

A magnetoresistive sensor such as a GMR or TMR sensor can be employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to maximize data density, it is necessary to minimize the track width of the data track written by the write head. In order to decrease the track width, it is necessary to minimize the width of the write pole itself. Unfortunately, limitations in manufacturing processes have limited the amount by which such write pole width can be minimized. In addition, such manufacturing processes have lead to write heads being formed with poorly defined, curved side walls and poorly defined track-widths.

SUMMARY OF THE INVENTION

The present invention provides a method for manufacturing a magnetic write head that includes depositing a RIEable fill layer and depositing a first CMP stop layer over the RIEable fill layer. A RIE mask is formed over the RIEable fill layer and the first CMP stop layer. A portion of the first CMP stop layer and the RIAable fill layer are removed to form a trench in the RIEable fill layer. A second CMP stop layer is deposited into the trench and over the RIE mask and a magnetic material is deposited. A first chemical mechanical polishing is performed until the second CMP stop layer has been reached, and then exposed portions of the second CMP stop layer are removed. A second chemical mechanical polishing process is then performed until the first CMP stop layer has been reached.

The use of two separate CMP processes that stop at two separate CMP stop layers results in a write pole having straight sides and a well defined trailing edge for a well controlled track width. This is a vast improvement over previous manufacturing processes wherein the trench ended up having a rounded top that resulted in a write pole having curved sides and a poorly defined track-width.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
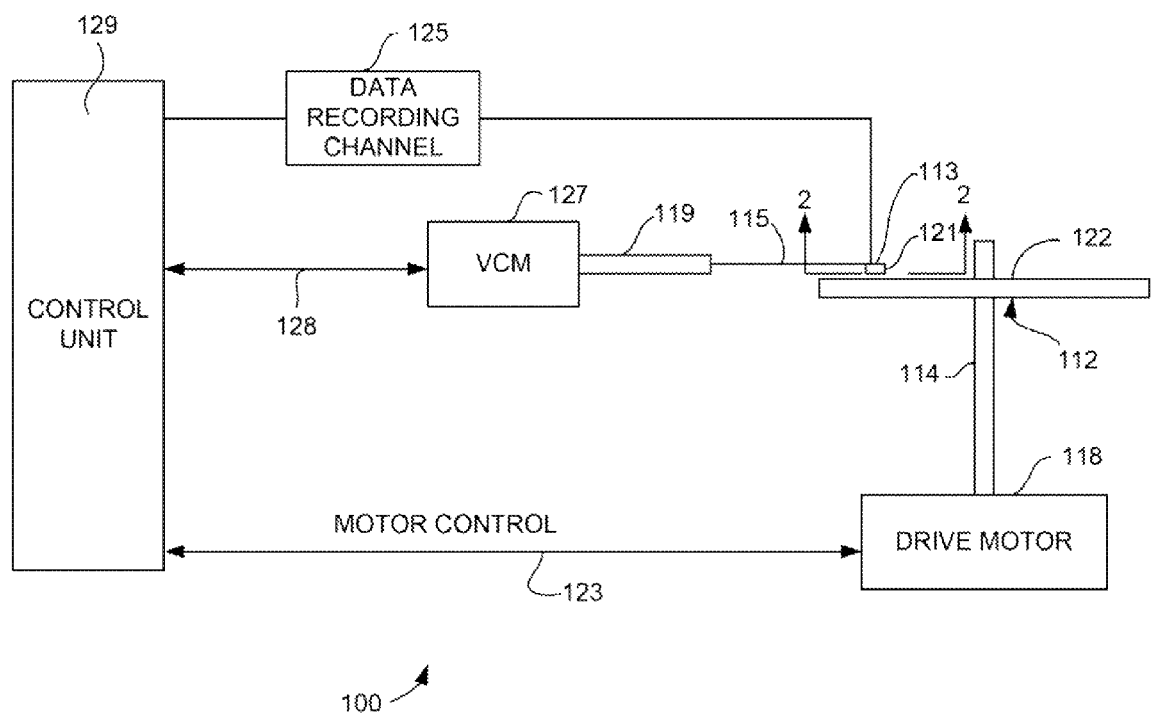
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
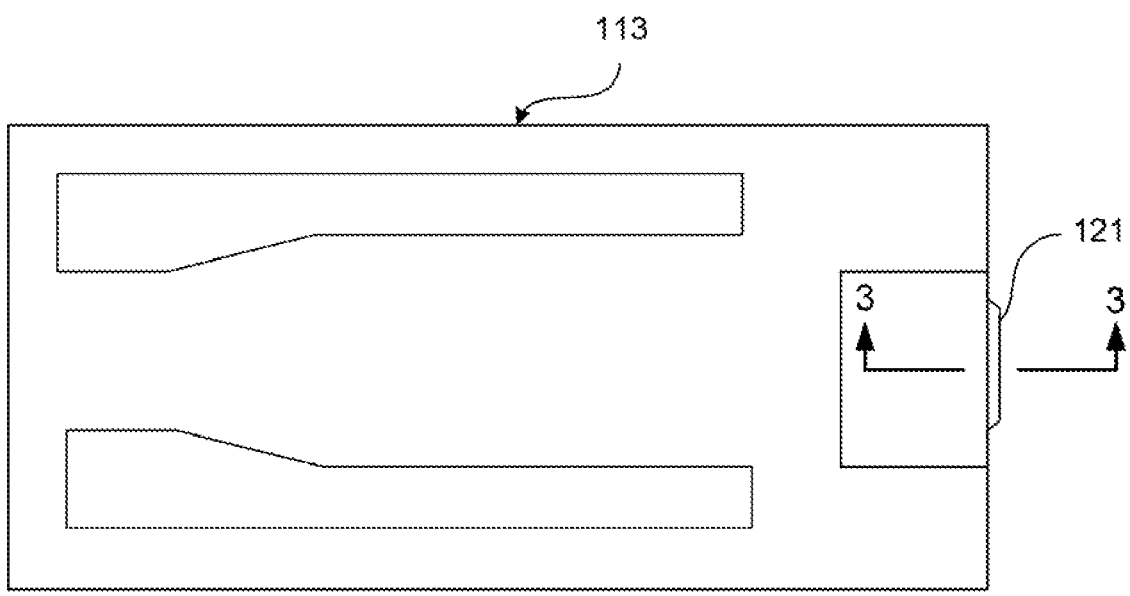
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
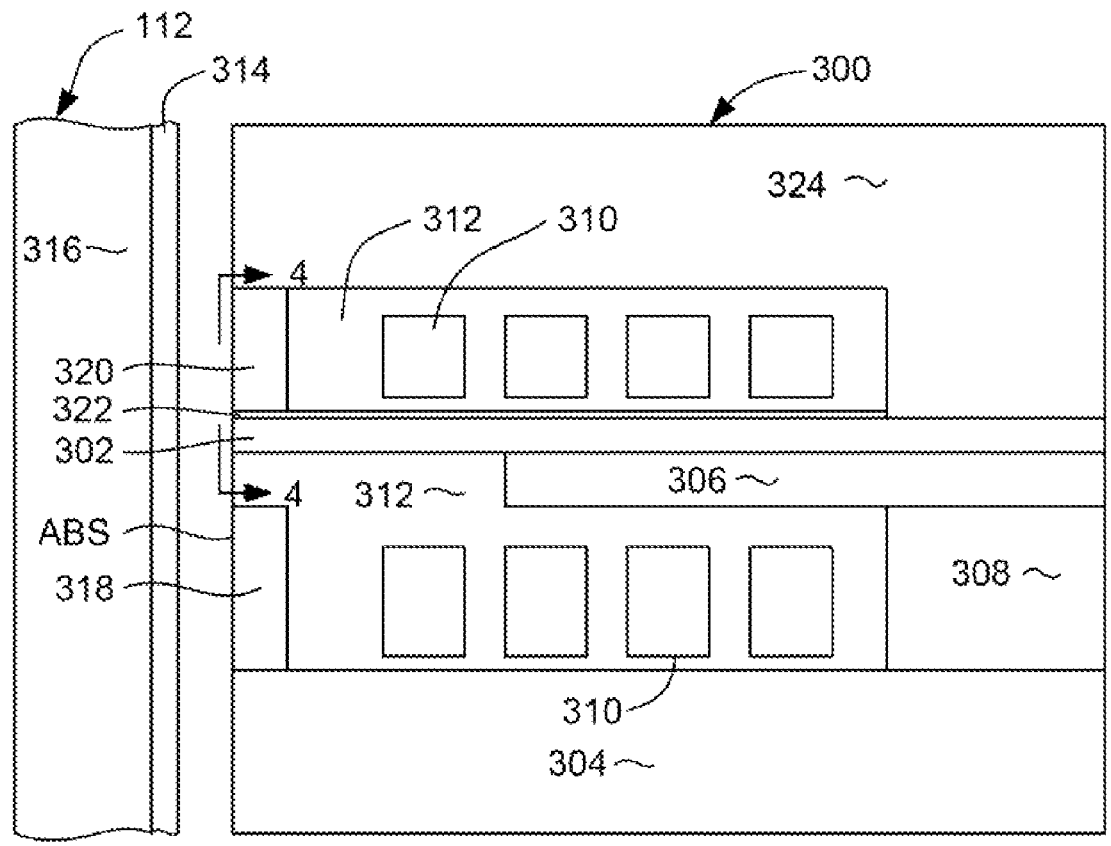
FIG. 3 is a cross sectional view of a magnetic head, taken from line 3-3 of FIG. 2 and rotated 90 degrees counterclockwise, of a magnetic head according to an embodiment of the present invention.

FIG. 3 is a side cross sectional view of a magnetic write head 300 that can be constructed by a method of the present invention. The write head 300 includes a magnetic write pole 302 and a magnetic return pole 304. The magnetic write pole 302 can be connected with a magnetic shaping layer 306 that helps to conduct magnetic flux to the tip of the write pole 302. The write pole 302 and shaping layer 306 can be connected with the magnetic return pole 304 by a magnetic back gap structure 308. A non-magnetic, electrically conductive write coil 310 passes between the return pole 304 and the write pole and shaping layer 302, 306, and may also pass above the write pole and shaping layer 302, 306. The write coil can be encased in a non-magnetic, electrically insulating material 312, which can be a material such as alumina and/or hard baked photoresist. When an electrical current flows through the write coil 310 a magnetic field is induced around the coil 310 that results in a magnetic flux flowing through the return pole 304, back gap layer 308, shaping layer 306 and write pole 302. This results in a write field being emitted from the tip of the write pole 302. This strong, highly concentrated write field locally magnetizes a magnetic top layer 314 of the magnetic media 112. The magnetic field then travels through a soft magnetic under-layer 316 of the magnetic media before returning to the return pole 304, where it is sufficiently spread out and weak that it does not erase the previously recorded bit of data.

With continued reference to FIG. 3, a magnetic pedestal structure 318 may be included at the air bearing surface (ABS) to prevent magnetic field from the write coil 310 from inadvertently reaching the magnetic media 112. The pedestal can be connected with the return pole and stops well short of the write pole 302. In addition, the write head 300 may include a magnetic trailing shield 320 that is located at the ABS and which is separated from the write pole 302 by a thin, non-magnetic trailing gap layer 322. The trailing shield 320 may be magnetically connected with the back portion of the write head 300 by a trailing return pole 324.

Figure 4:
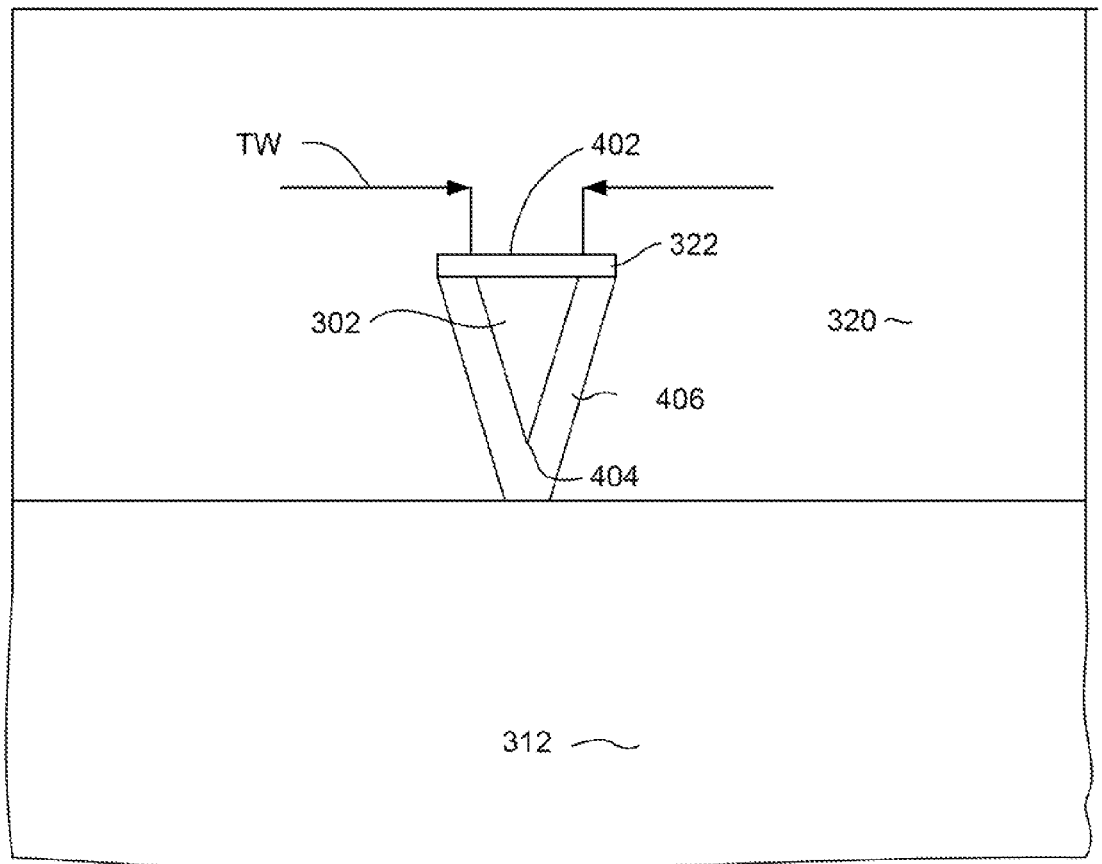
FIG. 4 is an ABS view of a portion of the read head of FIG. 3.

FIG. 4 shows an ABS view of a portion of the write head 300, and shows the write pole 302 enlarged for clarity. As can be seen in FIG. 4, the write pole 302 has a trapezoidal shape, being wider at the trailing edge 402 than at the leading edge 404. The width of the trailing edge 402 of the write pole defines the track-width (TW) of the write pole. The write pole 302 has a very narrow track-width TW. This narrow track width is made possible by a novel manufacturing process that will be described in greater detail herein below. In addition, it can be seen that the write pole 302 has straight, well defined sides. This also is made possible by the manufacturing process that will be described below.

Also, as can be seen in FIG. 4, the trailing shield 320 can be formed so that it wraps around the sides of the write pole 302. The wrap-around trailing shield 320 is separated from the sides of the write pole 302 by first and second non-magnetic side gap layers 406 and is separated from the trailing edge of the write pole 302 by the non-magnetic trailing gap layer 322.

Figure 5:
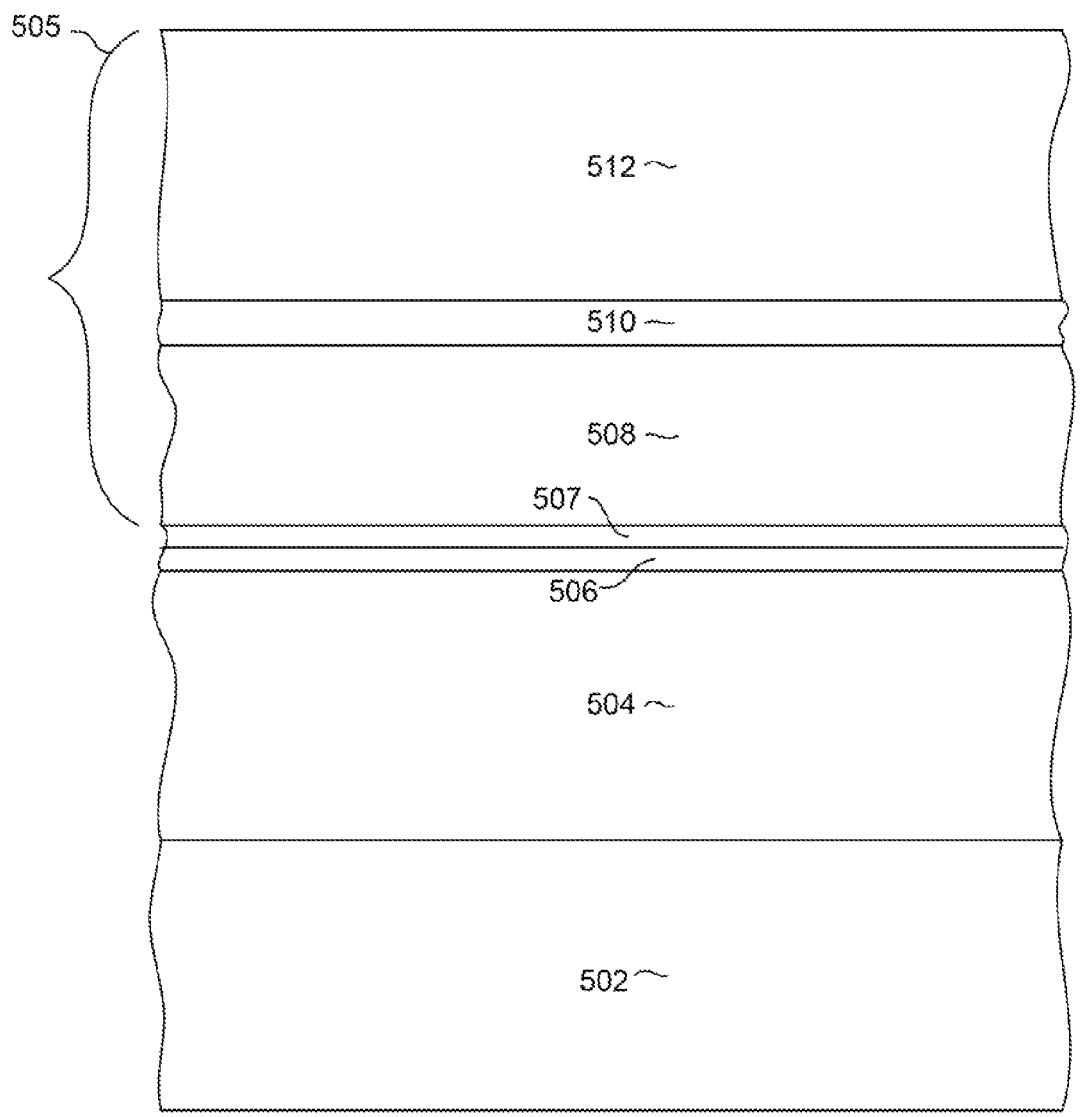
FIGS. 5-24 are views in various intermediate stages of manufacture, illustrating a method of manufacturing a magnetic write head according to an embodiment of the invention.

FIGS. 5-24 illustrate a method for manufacturing a magnetic write head according to an embodiment of the invention. With particular reference to FIG. 5, a substrate 502 is formed. The substrate 502 can include the insulation layer 312 and all or a portion of the shaping layer 306 described above with reference to FIG. 3, which have been planarized, such as by chemical mechanical polishing, to form a flat planar upper surface. A RIEable fill layer 504 is then deposited over the substrate 504. The RIEable fill layer 504 can be alumina ($Al_2O_3$) and is deposited to a thickness that is at least as thick as the thickness (from trailing edge to leading edge 402, 404) of a write pole 302 as described above in FIG. 4.

With continued reference to FIG. 5, a first CMP stop layer 506 is formed over the RIEable fill layer 504. The first CMP stop layer 506 can be constructed of Ru, diamond like carbon (DLC) or carbon (preferably Ru) and can be deposited to a thickness of 15-30 nm or about 20 nm. In addition, a capping layer 507 constructed of a material such as Ta, Ta$_2$O$_3$, Ta$_2$O$_5$, SiO$_2$, SiN, SiO$_x$N$_y$, or Al$_2$O$_3$, is deposited over the first CMP stop layer 506. The capping layer 507 protects the CMP stop layer 506 from breaking down during subsequent reactive ion etching processes, as will be described above. The capping layer 507 can be deposited to at thickness of 3-7 nm or about 5 nm.

With reference still to FIG. 5, a mask structure 505 is deposited over the CMP stop layer 506 and capping layer 507. The mask structure 505 can include an image transfer layer 508, a hard mask 510 formed over the image transfer layer 508, a resist layer 512 formed over the hard mask 510. The image transfer layer 508 can be constricted of a soluble polyimide material such as DURIMIDE® and can be deposited to a thickness of 100-300 nm or about 150 nm. The hard mask 510 is preferably a Si containing hard mask and can be constructed to a thickness of 30-50 nm or about 40 nm.

Figure 6:
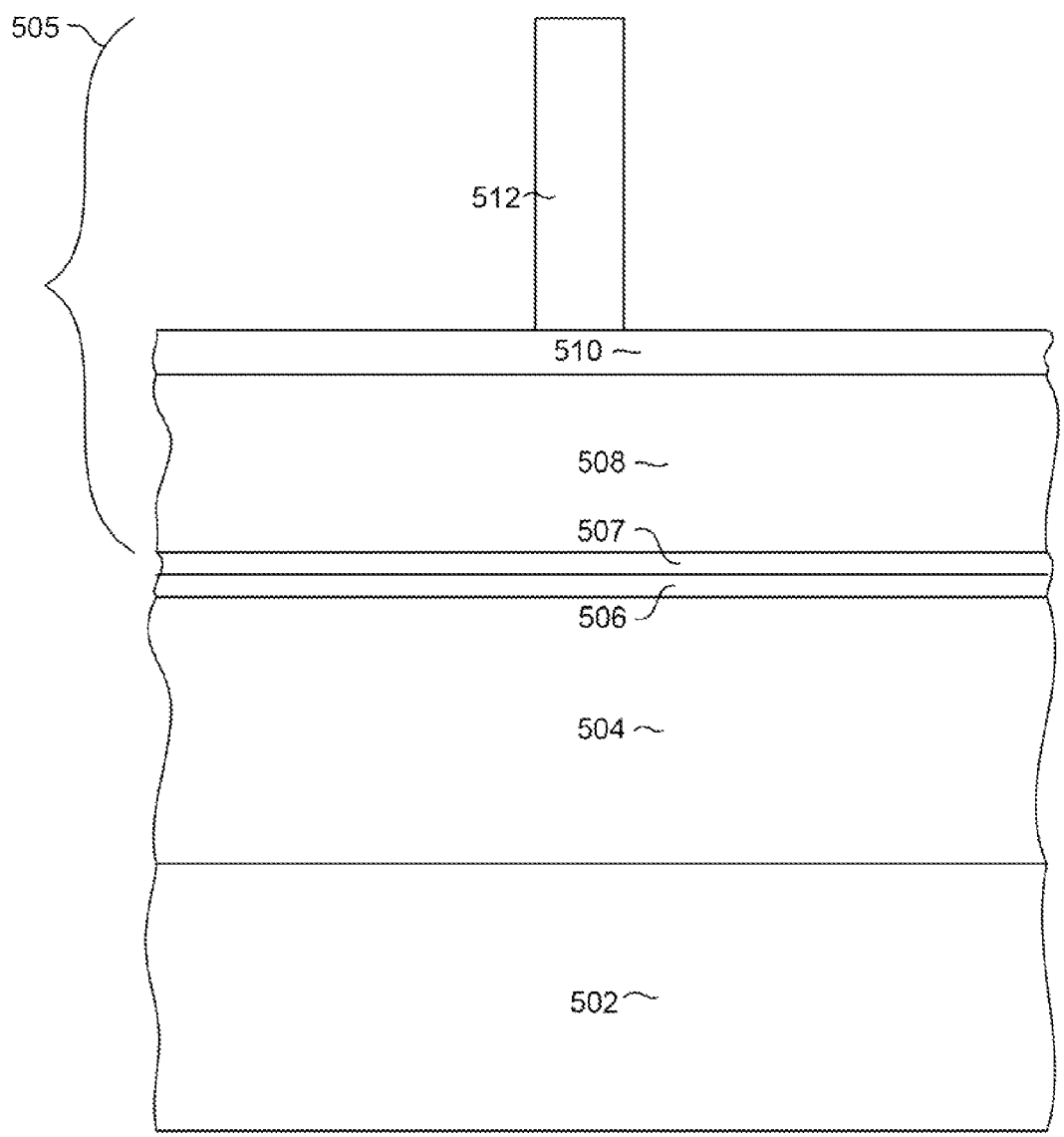

With reference now to FIG. 6, the resist layer 512 is photolithoraphically patterned and developed to form the photoresist mask 512 shown. FIG. 6 shows a cross section of a plane that is parallel with the air bearing surface (ABS) as viewed in a constant cross section throat region, but if viewed from above would include the constant cross section throat region and a flared region.

Figure 7:
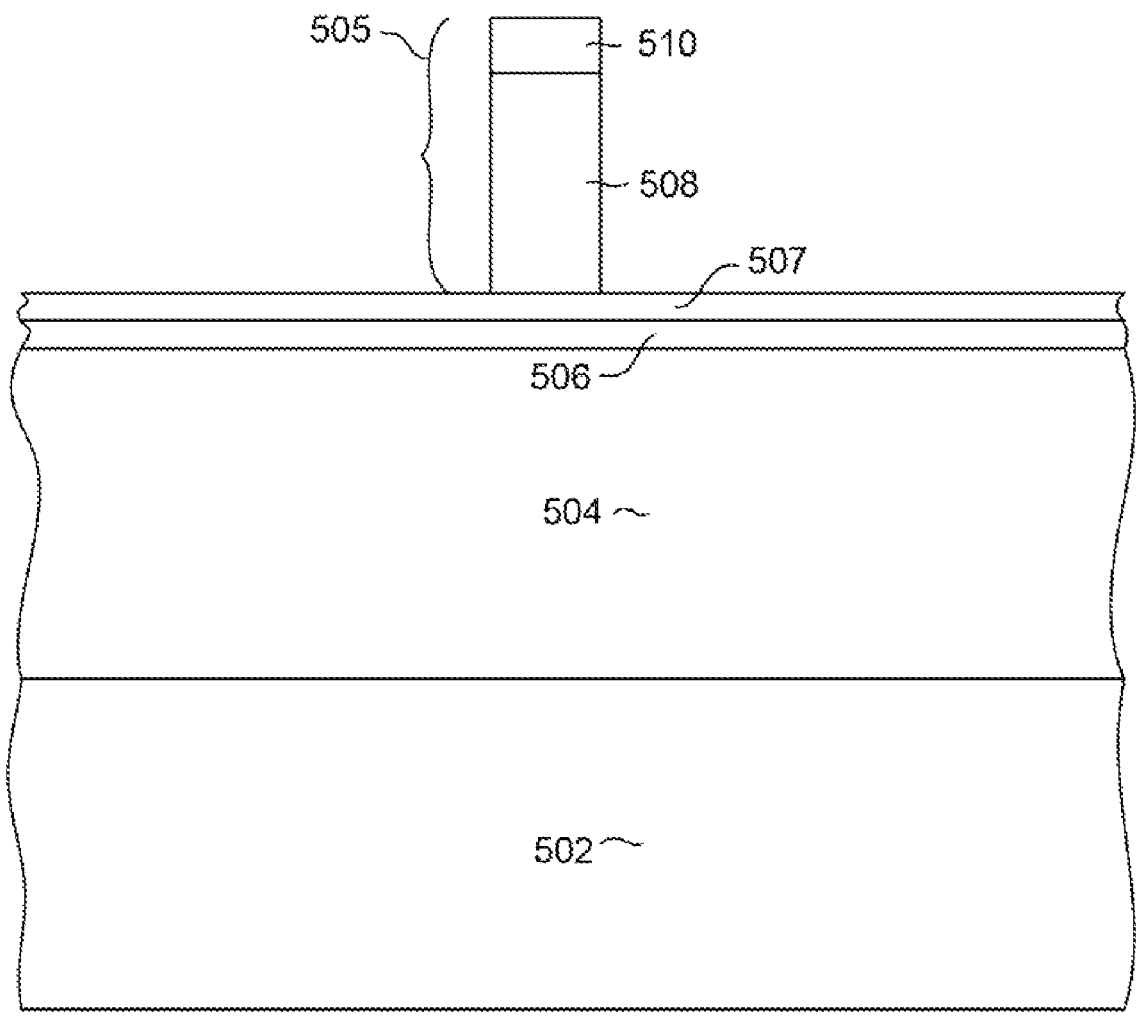

A reactive ion etching RIE can then be performed to transfer the image of the photoresist mask 512 onto the underlying hard mask 510 and image transfer layer 508, leaving a structure as shown in FIG. 7. All of a portion of the photoresist 512 may be consumed during this RIE process. The RIE process is preferably performed in an oxygen containing atmosphere.

Figure 8:
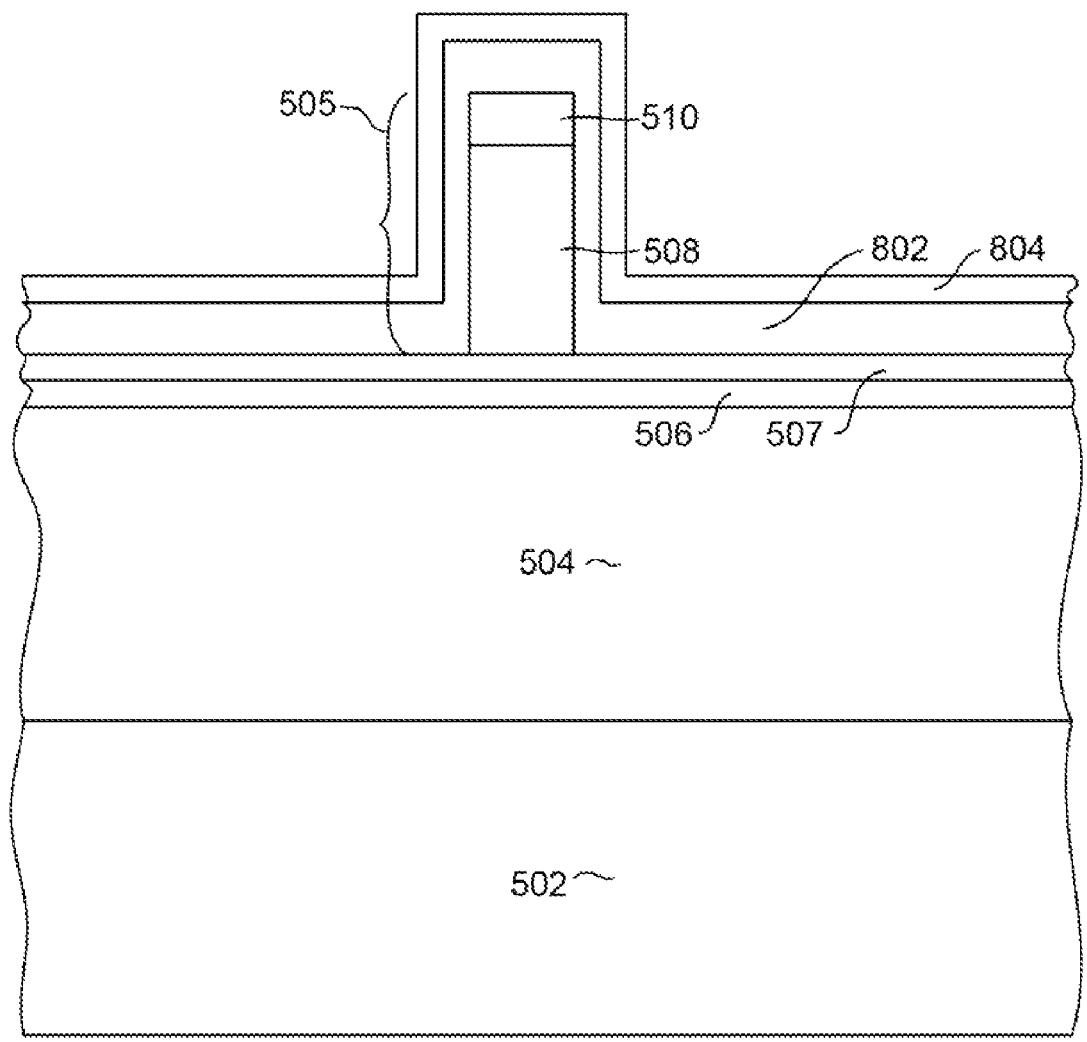

Then, with reference to FIG. 8 a reactive ion etching mask (RIE mask) layer 802 is deposited full film over the layers 506, 507 and over the remaining portion of the mask 505. The layer 802 can be NiCr and is deposited thick enough to withstand reactive ion etching processes used to remove the layer 506, 507 and to etch a trench into the fill layer 504, but sufficiently thin to be removed by a glancing angle ion milling as will be seen. To this end, the layer 802 can be deposited to a thickness of 50-200 nm or about 100 nm. A second capping layer 804 can also be deposited over the layer 802. The second capping layer 804 can be constructed of Ta and can be deposited to a thickness of 5-15 nm or about 20 nm.

Figure 9:
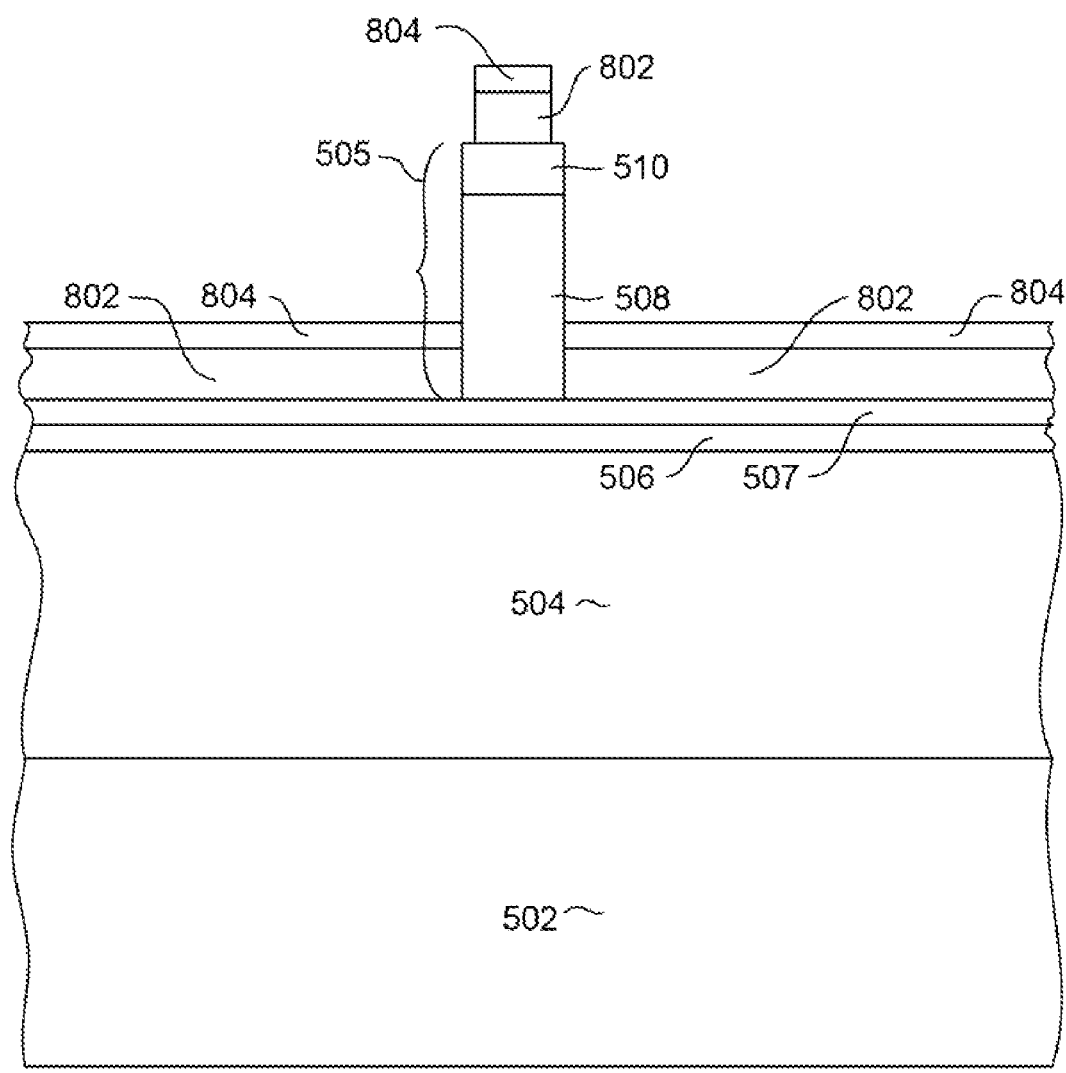
Figure 10:
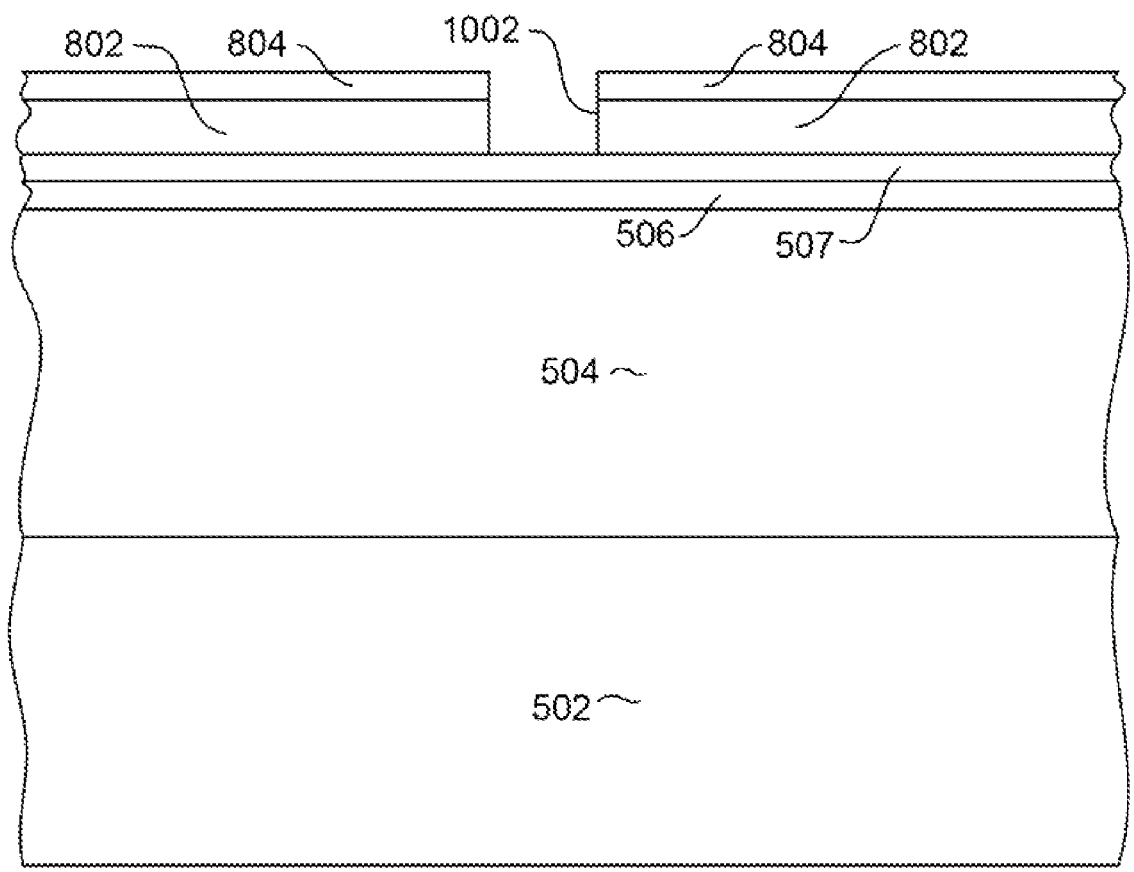

An ion milling is then performed at a glancing angle to remove portions of the layers 802, 804 from the sides of the mask 505, leaving a structure as shown in FIG. 9. The "glancing" ion milling is performed at an angle that is nearly parallel with the planes of the deposited layers 502, 504, 506, 507 or perpendicular to normal. The mask 505 can then be lifted off, such as by a chemical liftoff process, leaving a structure as shown in FIG. 10, with an opening 1002 formed in the layers 802, 804.

Figure 11:
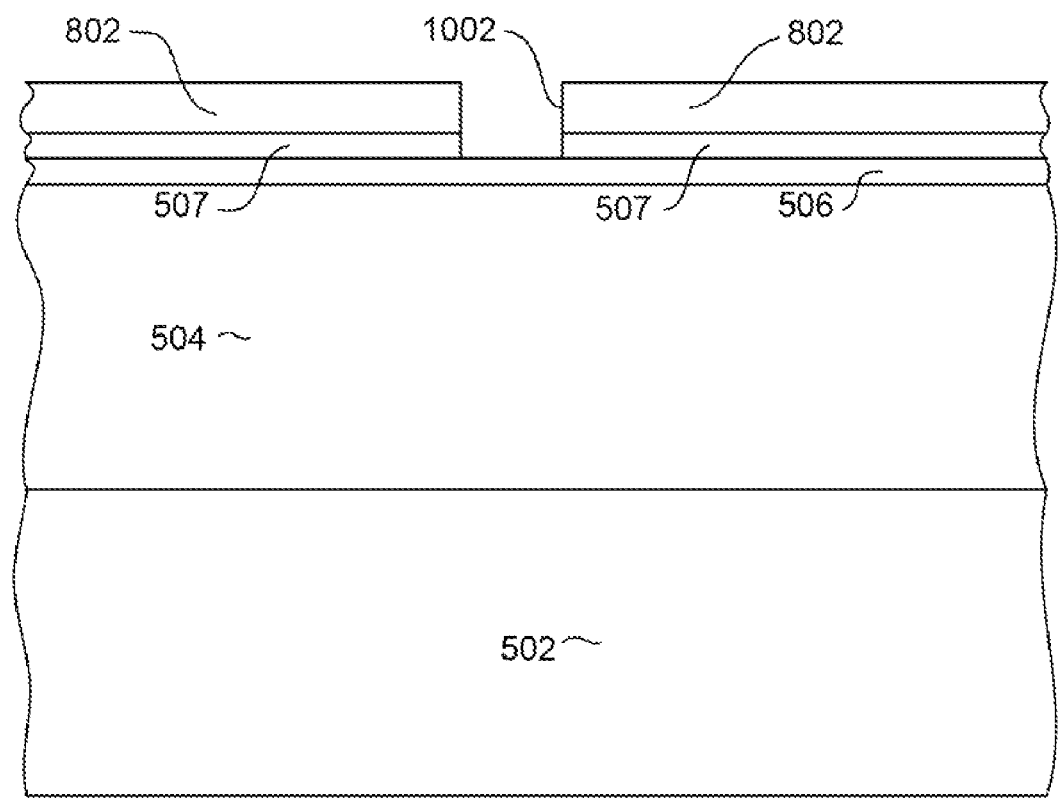
Figure 12:
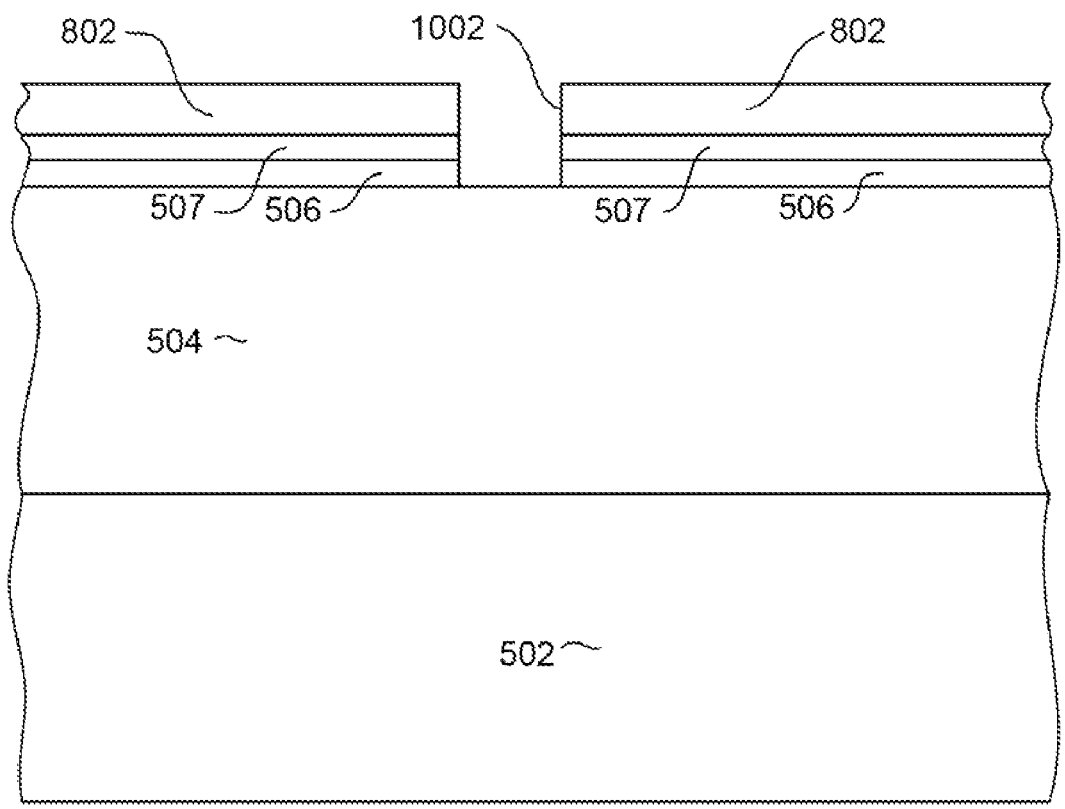

A reactive ion etching is then performed to remove portions of the Ta capping layer 507 that are exposed through the opening 1002 in the layers 802, 804. This reactive ion etching is performed using a CF$_4$ and CFH$_3$ based chemistry and leaves a structure as shown in FIG. 11. Then, another reactive ion etching is then performed to remove portions of the CMP stop layer 506 that are exposed through the opening 1002. This reactive ion etching is preferably performed in a O$_2$ based chemistry and results in a structure as shown in FIG. 12. A simpler case could be when CMP stop layer 506 is carbon or DLC, then only BCl$_3$ based chemistry reactive ion etch need be performed to etch through layer 507 (Ta), layer 506 (DLC or C), and layer 504, and form a trench structure as shown in FIG. 13.

Figure 13:
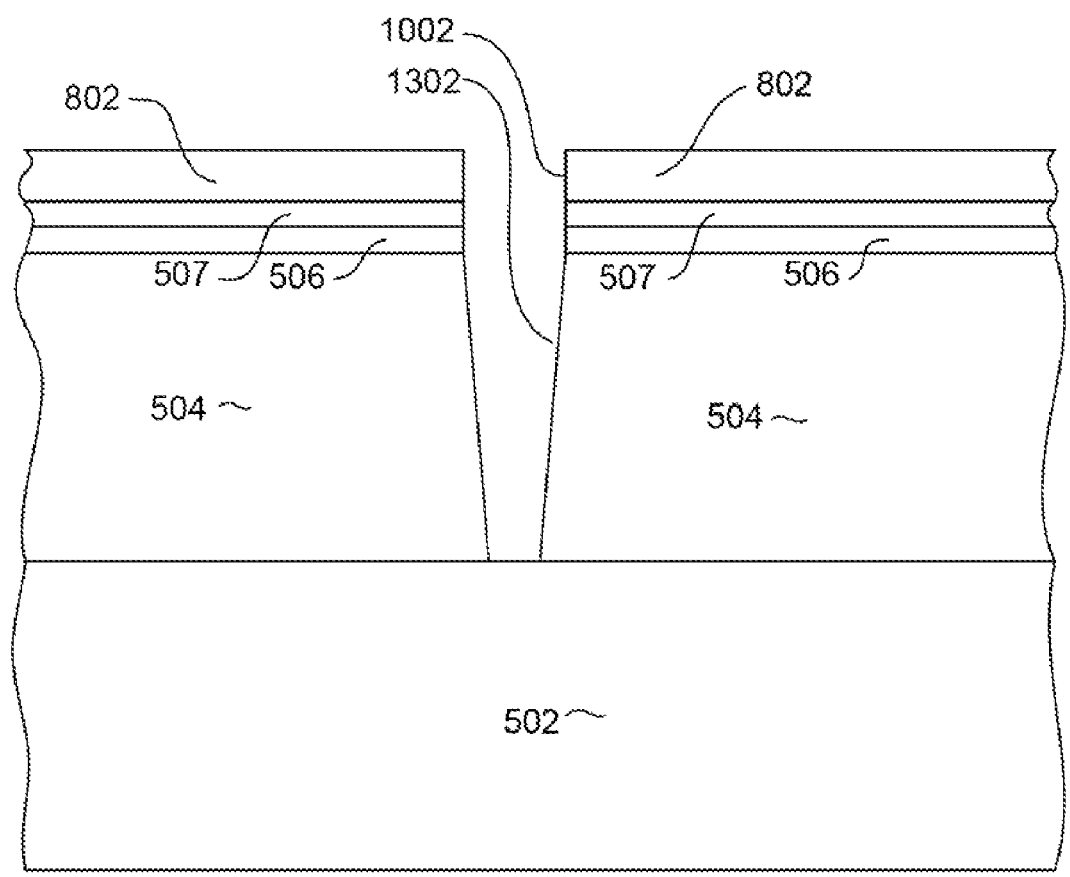

With reference now to FIG. 13, yet another reactive ion etching is performed to remove portions of the REIable fill layer 504 that are not protected by the layers 506, 507, 802 to form a trench 1302 in the fill layer 504. If the fill layer 504 comprises alumina, then the reactive ion etching can be performed in a BCl$_3$ based chemistry to preferentially remove the alumina. The reactive ion etching conditions are also preferably selected to form the trench 1302 with tapered side walls as shown. It should be pointed out at this point that layer 802 protects the underlying CMP stop layer 506 during this series of RIE processes.

Figure 14:
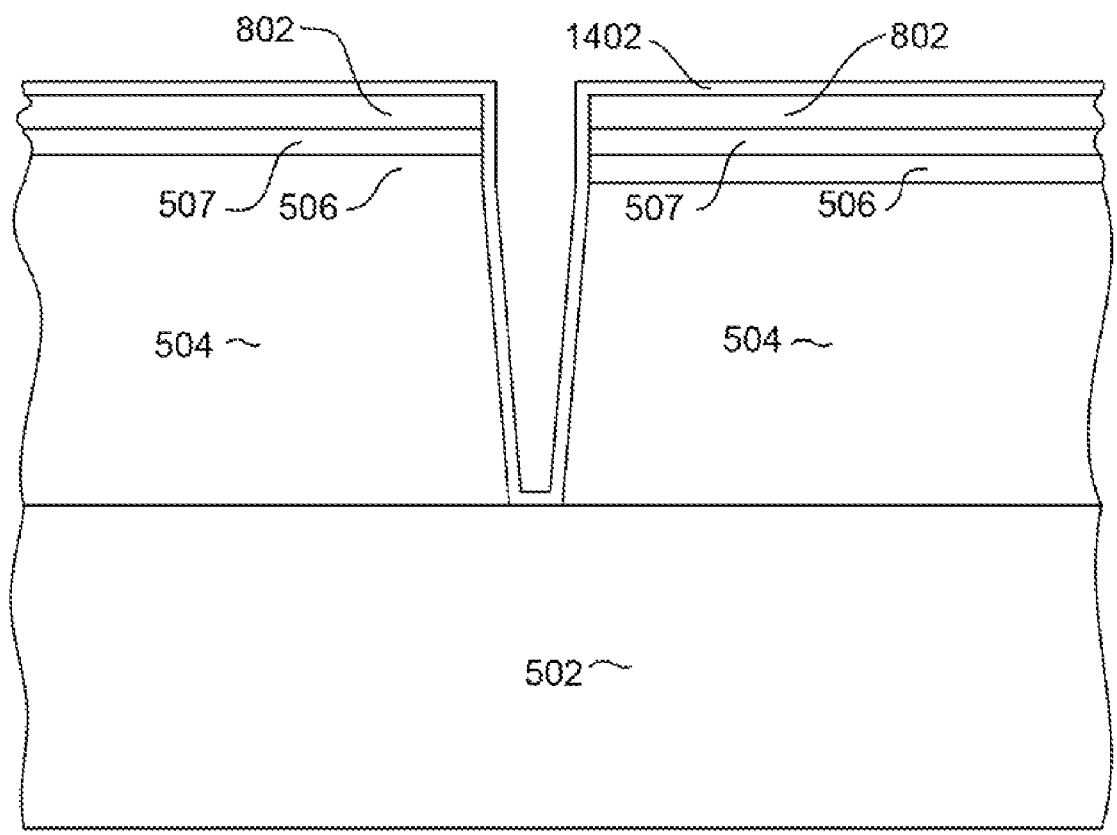

After the trench 1302 has been formed in the fill layer 504, a second non-magnetic second CMP stop layer 1402 is deposited as shown in FIG. 14. The second non-magnetic second CMP stop layer 1402 can be constructed of Ru, preferably deposited by a conformal deposition process such as atomic layer deposition. The non-magnetic layer 1402 serves several functions. First it comprises an electrically conductive metal (such as Ru) so that it can serve as a seed layer for a future electroplating process (as will be described below). Second, since it is non-magnetic, it reduces width of the opening 1302, thereby advantageously reducing the track width of the write pole that will be formed. Third, the non-magnetic layer 1402 can provide all or a portion of a non-magnetic side wall (side wall 406 in FIG. 4) to separate the sides of the write pole 302 from the shield 320 (FIG. 4). Fourth, the layer 1402 serves as second chemical mechanical polishing stop layer (second CMP stop layer), as will be seen.

Figure 15:
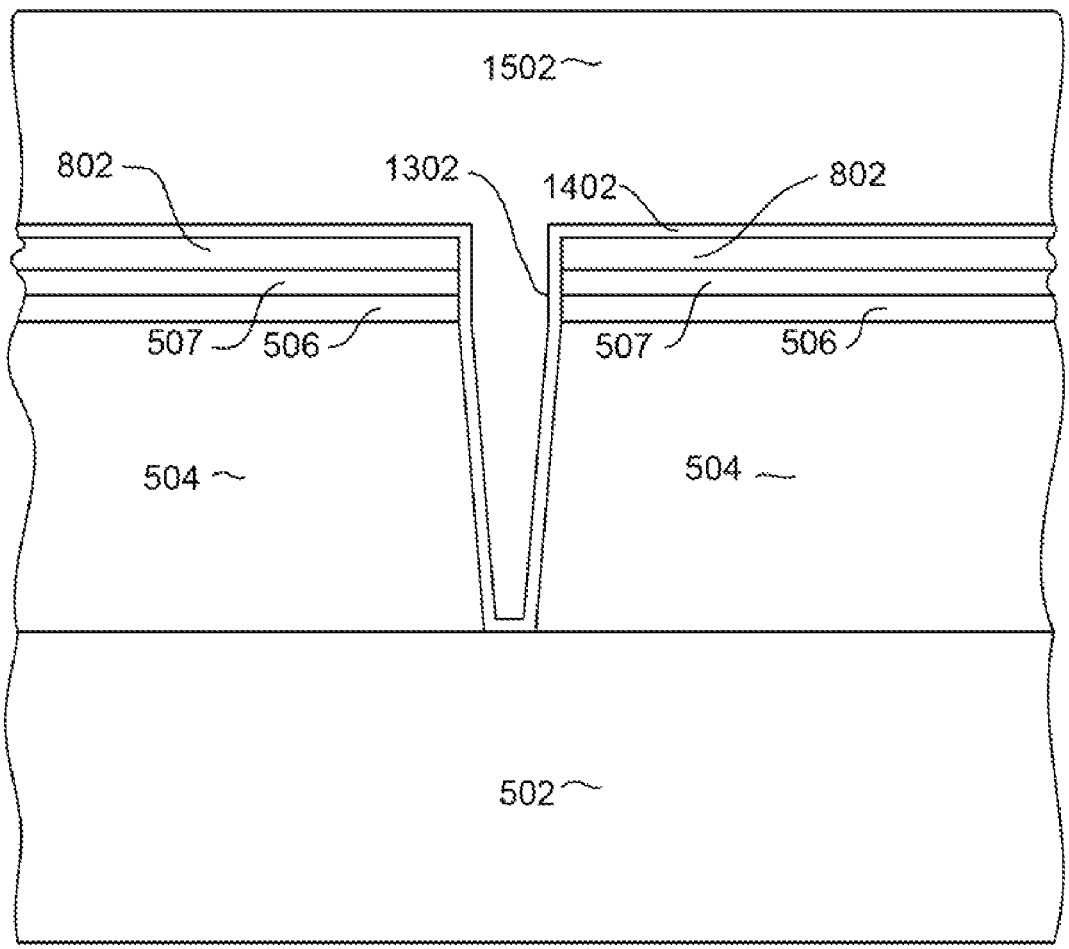
Figure 16:
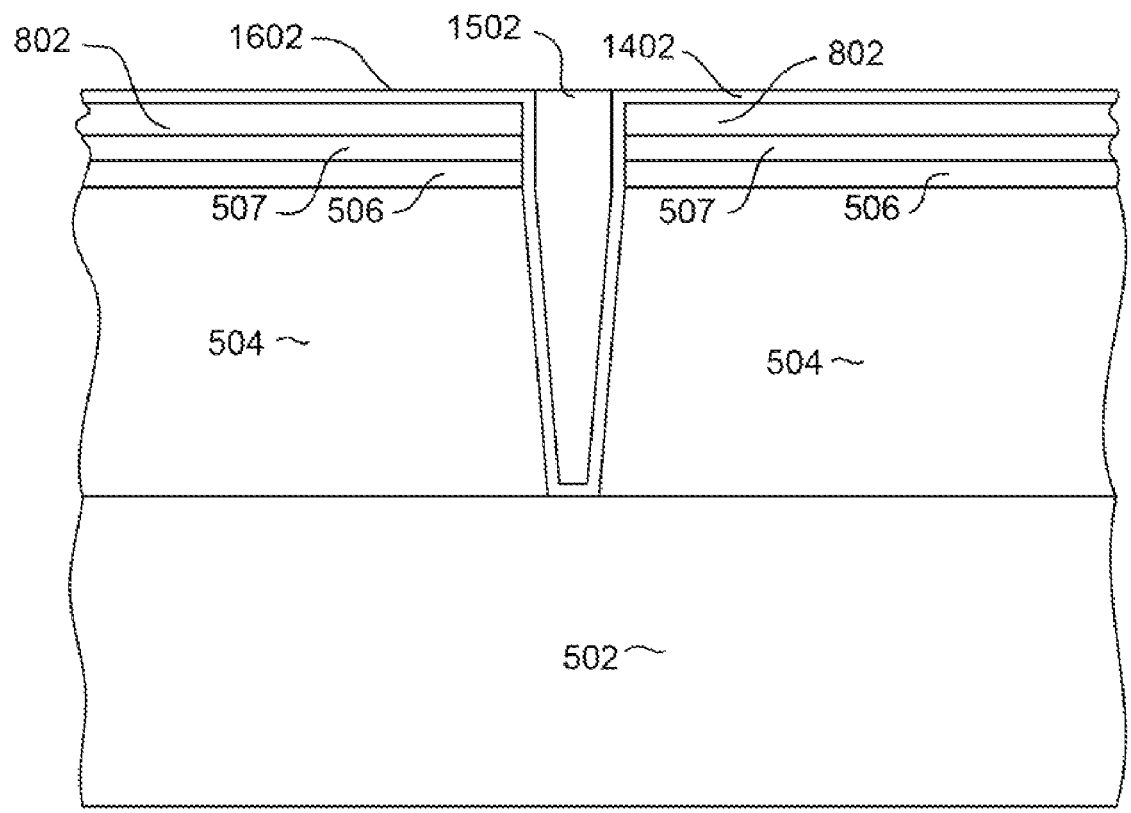
Figure 17:
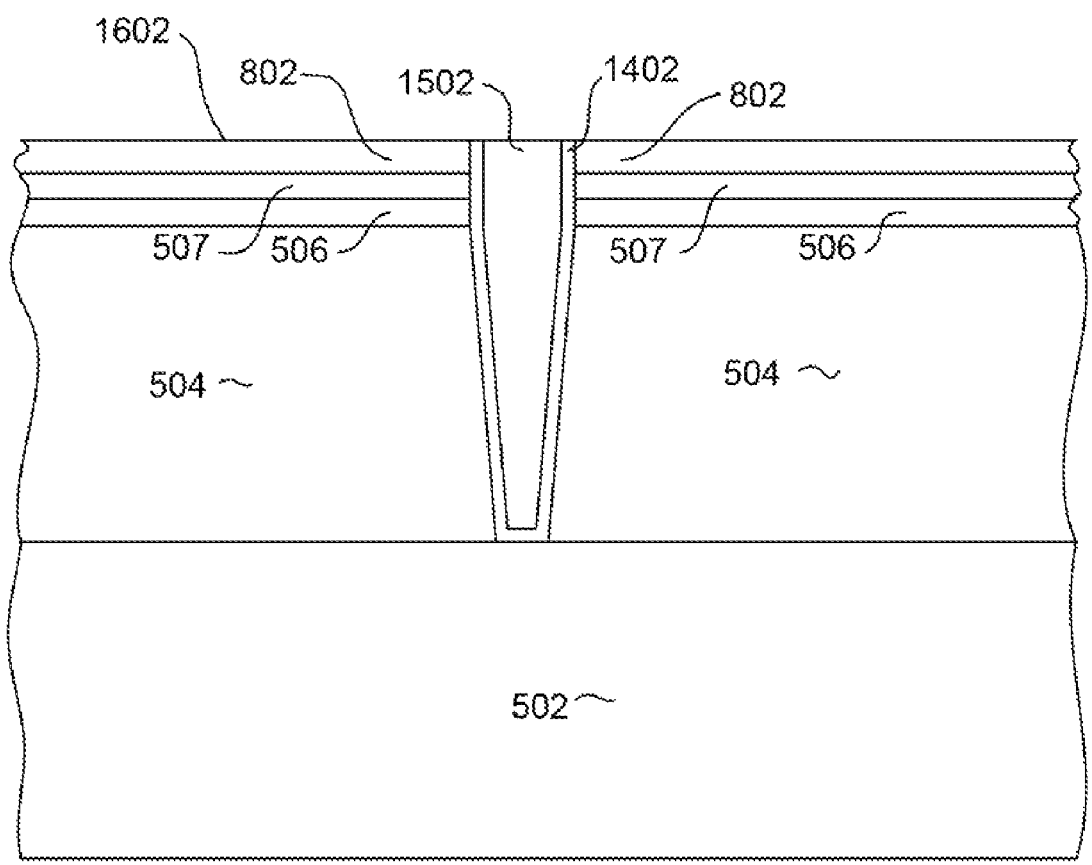

With the non-magnetic seed layer/CMP stop layer 1402 deposited, a magnetic material 1502 such as CoNiFe is electroplated, leaving a structure as shown in FIG. 15. As can be seen, the magnetic material 1502 completely fills the trench 1302 and preferably extends out of the top of the trench, at least slightly. A first chemical mechanical polishing process is then performed to remove portions of the magnetic material 1502 that extend out the trench 1302. The first chemical mechanical polishing process stops at the Ru layer 1402 which, as discussed above, acts as a CMP stop layer. This leaves a structure as shown in FIG. 16 with a planar upper surface 1602. A quick ion milling can then be performed to remove the exposed portions of the Ru layer 1402, leaving a structure as shown in FIG. 17. Another chemical mechanical polishing is then performed to remove the layers 802, 507 stopping at the first CMP stop layer 506. This leaves as structure s shown in FIG. 18.

The use of two separate CMP processes stopping at two separate CMP stop layers, as described above results in a magnetic write pole having straight, well defined sides and a well defined trailing edge width (e.g. track-width). Previous processes, which used only a single CMP step, if any, resulted in a trench having a rounded top or dished pole top surface which, in turn resulted in a write pole having sides that round outward toward the trailing edge. This resulted, not only in poorly defined curved sides, but worse resulted in a poorly defined track width. Since the width of the trailing edge of the write pole (e.g. track-width) is one of the most important parameters of a write head, this imprecision of the trailing edge width was unacceptable, especially at very small track-widths.

At this point a couple of options exist for continued processing. One possible option is to perform an ion milling on the structure of FIG. 18 to remove the CMP stop layer 506, leaving a structure as shown in FIG. 19. At this point, the fill layer 504 could be left in place, and a trailing shield (one that does not wrap around the sides of the write pole 1502) could be formed by first depositing a non-magnetic seed layer/trailing gap layer (not shown) such as Ru and then electroplating a magnetic material (also not shown) over the non-magnetic seed/trailing gap layer. Or, the fill material 504 can be removed by common $Al_2O_3$ wet etch process with EDTA solution followed by the deposition of a non-magnetic seed/gap layer and electroplating of a trailing, wrap-around magnetic shield.

Figure 18:
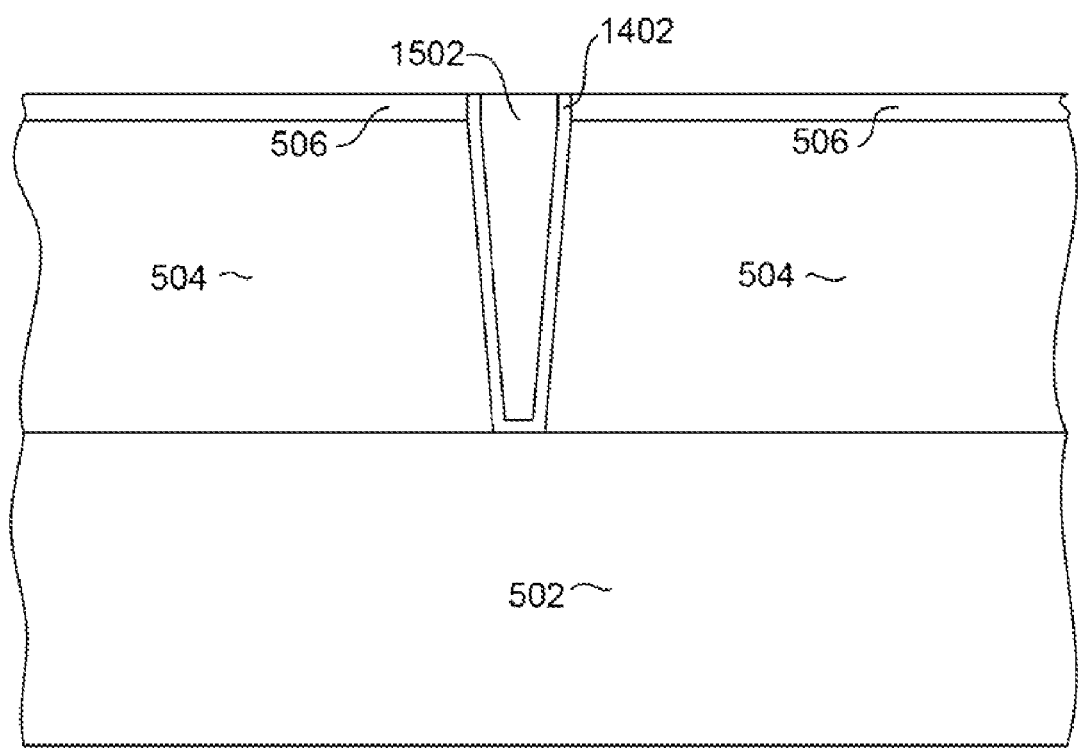
Figure 19:
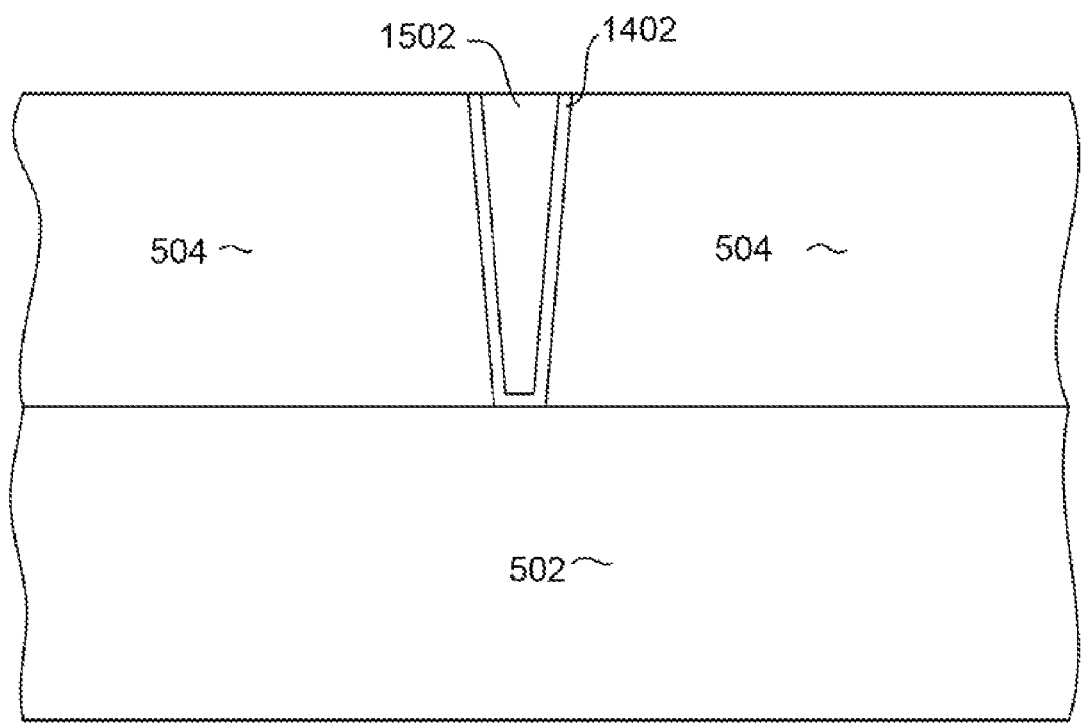
Figure 20:
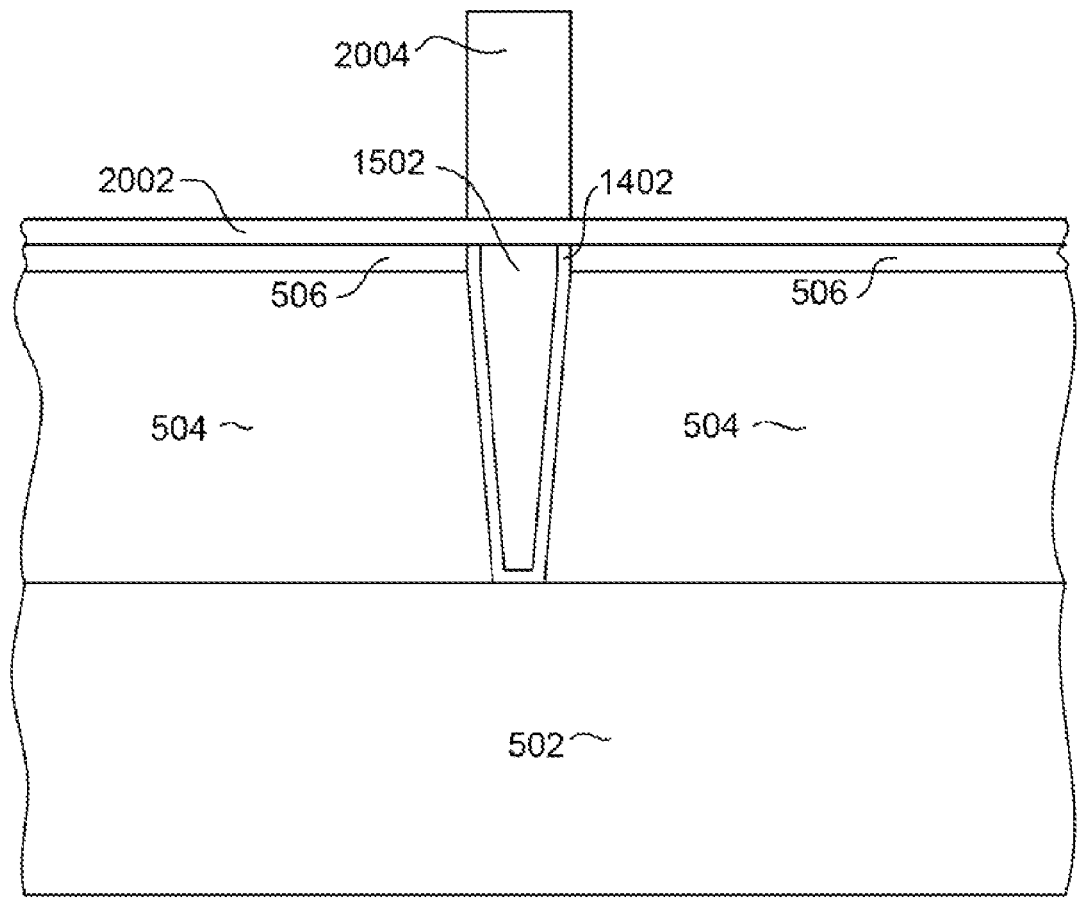
Figure 21:
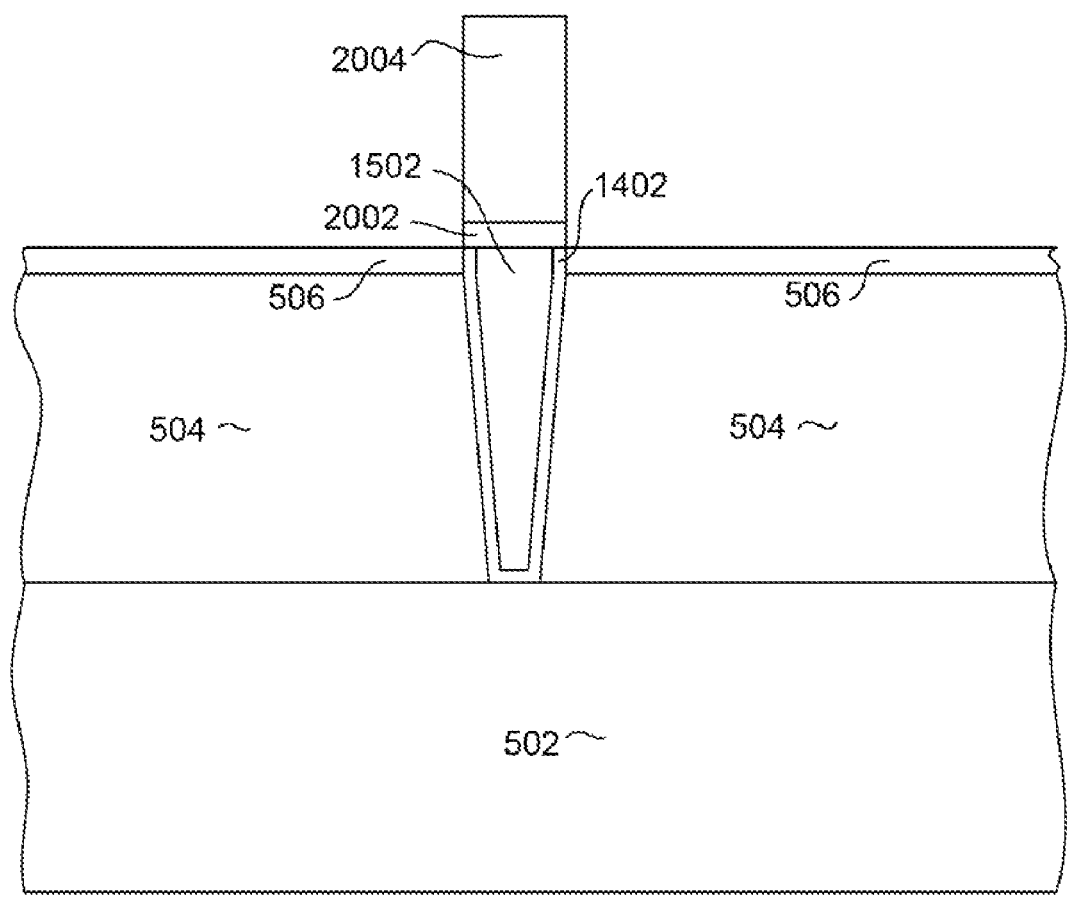
Figure 22:
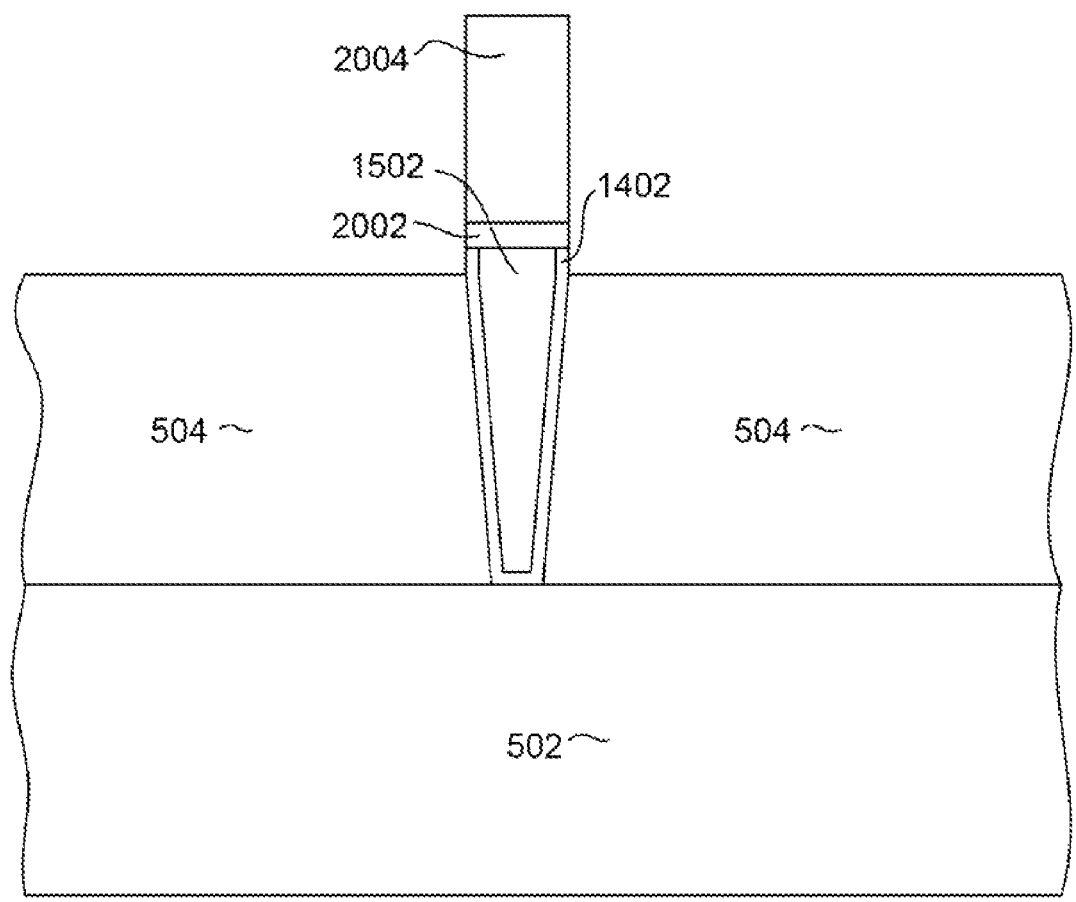
Figure 23:
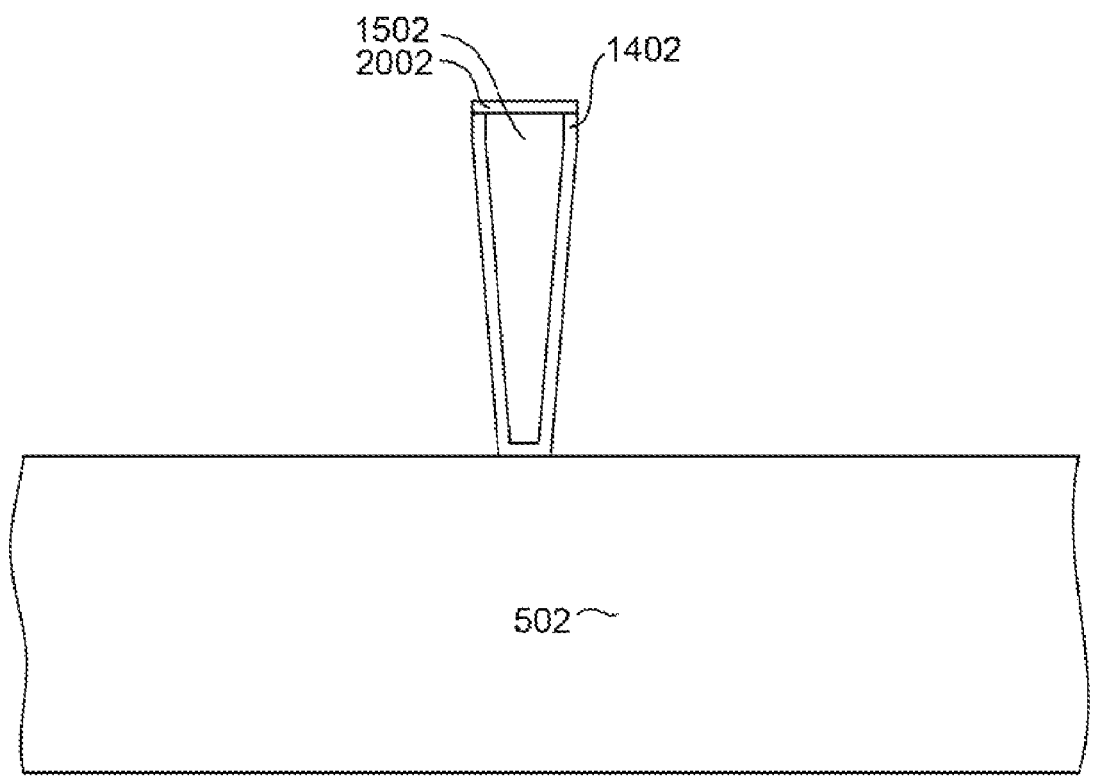
Figure 24:
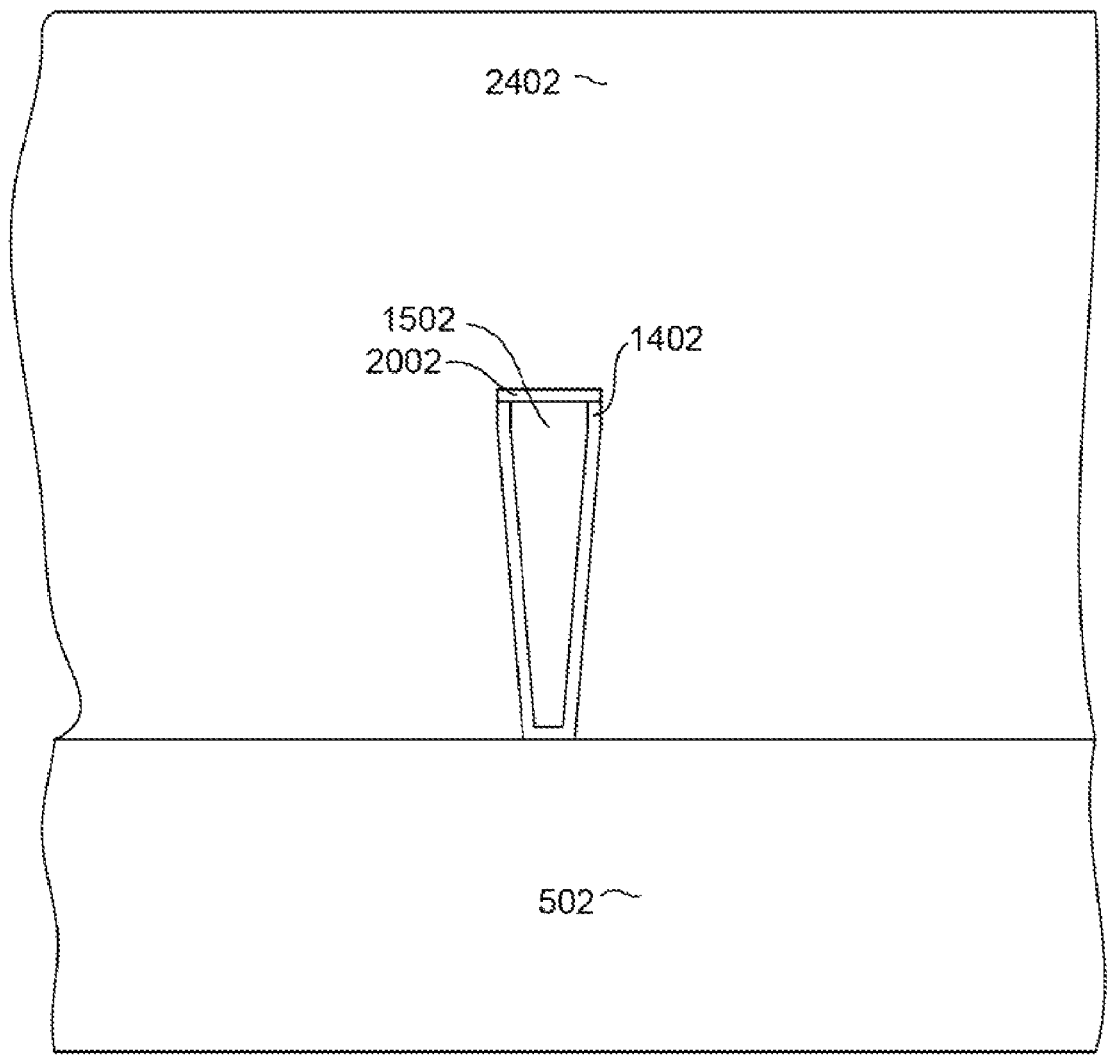

In another option, starting with a structure such as shown in FIG. 18, a mask 2004 can be formed over the write pole after layer 2002 of DLC or C is deposited, as shown in FIG. 20. Then, a reactive ion etching can be performed to remove portions of the layer 2002 that are not protected by the mask 2004, leaving a structure as shown in FIG. 21. This can be followed by an ion milling or another RIE to remove the layer 506, leaving a structure as shown in FIG. 22. Common $Al_2O_3$ wet etch process with EDTA solution can then be performed to remove the remaining fill layer 504. The mask 2004 can then be lifted off, leaving a structure as shown in FIG. 23. Then, with reference to FIG. 24 a magnetic material 2402 can be electroplated to form a trailing magnetic shield.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head, comprising:
    forming a substrate;
    depositing a fill layer over the substrate;
    depositing a first CMP stop layer over the fill layer;
    forming a mask structure over the substrate;
    depositing a RIE mask layer over the first CMP stop layer and the mask structure;
    removing the mask structure to leave an opening in the RIE mask layer;
    performing a first reactive ion etching to remove portions of the first CMP stop layer that are exposed through the opening in the RIE mask to expose a portion of the fill layer;
    performing second reactive ion etching to remove the exposed portion of the fill layer to form a trench in the fill layer;
    depositing a second CMP stop layer, a portion of the second CMP stop layer extending outside of the trench;
    electroplating a magnetic material;
    performing a first chemical mechanical polishing, the first chemical mechanical polishing terminating at the second CMP stop layer;
    performing an ion milling to remove portions of the second CMP stop layer that that extend outside of the trench; and
    performing a second chemical mechanical polishing to remove the hard mask layer; the second chemical mechanical polishing terminating at the first CMP stop layer.

2. The method as in claim 1 wherein the second CMP stop layer comprises an electrically conductive, non-magnetic material.

3. The method as in claim 1 wherein the second CMP stop layer comprises an electrically conductive material deposited by a conformal deposition process.

4. The method as in claim 1 wherein the second CMP stop layer comprises an electrically conductive material deposited by atomic layer deposition.

5. The method as in claim 1 wherein the second CMP stop layer comprises Ru.

6. The method as in claim 1 wherein the first CMP stop layer comprises Ru, diamond like carbon or carbon.

7. The method as in claim 1 wherein the RIE mask layer comprises NiCr.

8. The method as in claim 1 wherein the fill layer comprises alumina.

9. The method as in claim 1 wherein the removing the mask structure further comprises, performing an ion milling at a glancing angle to remove RIE mask layer from side portions of the mask structure and performing a chemical liftoff.

10. The method as in claim 1 wherein the first reactive ion etching is performed using a $CF_4/CFH_3$ based and a $O_2$ based chemistry.

11. The method as in claim 1 wherein the second reactive ion etching is performed in a $BCl_3$ based chemistry.

12. The method as in claim 1 wherein the first CMP stop layer is carbon or DLC, $BCl_3$ based chemistry reactive ion etching can be performed as single step RIE to replace both the first and the second reactive ion etching steps.

13. The method as in claim 1 further comprising, after depositing the RIE mask layer, depositing a capping layer over the hard mask layer.

14. The method as in claim 1 further comprising, after depositing the RIE mask layer depositing a layer of Ta over the hard mask layer.

15. A method for manufacturing a magnetic write head, comprising:
    forming a substrate;
    depositing a fill layer over the substrate;
    depositing a first CMP stop layer over the fill layer;
    depositing a capping layer over the first CMP stop layer;
    forming a mask structure over the capping layer;
    depositing a RIE mask layer over the first CMP stop layer and the mask structure;
    removing the mask structure to leave an opening in the RIE mask layer;
    performing a first reactive ion etching to remove portions of the first CMP stop layer that are exposed through the opening in the RIE mask to expose a portion of the fill layer;
    performing second reactive ion etching to remove the exposed portion of the fill layer to form a trench in the fill layer;
    depositing a second CMP stop layer, a portion of the second CMP stop layer extending outside of the trench;
    electroplating a magnetic material;
    performing a first chemical mechanical polishing, the first chemical mechanical polishing terminating at the second CMP stop layer;
    performing an ion milling to remove portions of the second CMP stop layer that that extend outside of the trench; and
    performing a second chemical mechanical polishing to remove the hard mask layer; the second chemical mechanical polishing terminating at the first CMP stop layer.

16. The method as in claim 15 wherein the capping layer comprises Ta.

17. The method as in claim 15 wherein the first CMP stop layer comprises Ru, diamond like carbon or carbon and the capping layer comprises Ta, $Ta_2O_3$, $Ta_2O_5$, $SiO_2$, SiN, $SiO_xN_y$, or $Al_2O_3$.

18. The method as in claim 15 wherein the second CMP stop layer comprises an electrically conductive, non-magnetic material.

19. The method as in claim 15 wherein the second CMP stop layer comprises an electrically conductive material deposited by a conformal deposition process.

20. The method as in claim 15 wherein the second CMP stop layer comprises Ru.

21. The method as in claim 15 wherein the RIE mask comprises NiCr.

22. A method for manufacturing a magnetic write head, comprising:
   depositing a RIEable fill layer;
   depositing a first CMP stop layer over the RIEable fill layer;
   forming a RIE mask over the RIEable fill layer and the first CMP stop layer; removing portions of the first CMP stop layer and the RIAable fill layer to form a trench in the RIEable fill layer;
   depositing a second CMP stop layer into the trench and over the RIE mask;
   depositing a magnetic material;
   performing a first chemical mechanical polishing until the second CMP stop layer has been reached;
   removing exposed portions of the second CMP stop layer; and
   performing a second chemical mechanical polishing until the first CMP stop layer has been reached.

23. The method as in claim 22, further comprising, after depositing the first CMP stop layer and before forming the RIE mask, depositing a capping layer over the first CMP stop layer.

24. The method as in claim 22 wherein the capping layer comprises Ta, $Ta_2O_3$, $Ta_2O_5$, $SiO_2$, SiN, $SiO_xN_y$, or $Al_2O_3$.

25. The method as in claim 22 wherein the first CMP stop layer comprises Ru, carbon or diamond like carbon, and the second CMP stop layer comprises Ru.

* * * * *